Patented Dec. 17, 1940

2,225,368

UNITED STATES PATENT OFFICE 2,225,368

METHOD OF PREPARING SUBSTITUTED DIARYLAMINES

David Craig, Akron, Ohio, assignor to The B. F. Goodrich Company, New York, N. Y., a corporation of New York No Drawing. Application July 28, 1937, Serial No. 156,174

4 Claims. (Cl. 260—576)

This invention is concerned with a new method of manufacturing substituted diarylamines, and has as its principal object the introduction of substituent groupings, particularly hydrocarbon groupings, into diarylamines by reaction with an alcohol or ether.

It has long been known that certain diarylamines of relatively simple structure, such as diphenylamine or phenyl-beta-naphthylamine, are relatively easy to prepare and therefore are available on the market at moderate prices. However, if substituent groupings are introduced into the molecules of such amines by commercially known methods, the cost of manufacture is considerably increased. Thus, the ditoylamines and the tolyl naphthylamines are comparatively expensive. Moreover in some instances, as in the reaction of beta-naphthol with o-tert.butylaniline, the usual method of preparation does not give the desired substituted diarylamine but instead the corresponding unsubstituted diarylamine and an unsaturated hydrocarbon are obtained. It is therefore necessary to find other methods of making substituted diarylamines.

I have discovered that by reacting diarylamines with alcohols or ethers, I can produce nuclear substituted diarylamines. The products thus secured are mixtures of more or less complexity which are of value as compounding ingredients for rubber. They are of special value as antioxidants in rubber, gasoline, aldehydes, oils, synthetic plastics, and in other organic materials in which diarylamines as a class are effective as age resisters. By varying the reacting conditions, I am able, if desired, to produce good yields of reasonably pure compounds which may then be separated from the mixture of products and obtained in a pure state.

The diarylamines which are employed as starting materials in this invention are all secondary amines containing an amino nitrogen attached by single bonds to nuclear carbon atoms of two aromatic groups. Illustrative of the types of diarylamines that may be employed, the following may be cited: diphenylamine, di-alpha-naphthylamine, di-beta-naphthylamine, the phenyl naphthylamines, ortho, meta, or para ditolylamine, the phenyl tolyl amines, di-p-cumylamine, o-cumyl phenylamine, di-p-xenylamine, p-xenyl phenylamine, dianilinodiphenylmethane, anilinotetraphenylmethane, N,N'diphenyl-p-phenylene diamine, 6-anilino quinoline, anilino indane, etc.

The alcohols or ethers with which the diarylamines react must contain the oxygen attached by a single bond to a non-aromatic carbon atom. By a non-aromatic carbon atom, I mean one which is not included in the nucleus of an aromatic ring. Typical compounds include methanol, ethanol, the propanols, the butanols, the pentanols, cyclohexanol, benzyl alcohol, dimethylether, diethylether, the dipropylethers, methyl ethyl ether, dibenzylether, methyl benzyl ether, etc.

Alcohols and ethers may be considered equivalents for this reaction, for under the conditions under which it is carried out, both alcohols and ethers probably exist in the solution. Thus, if the reaction is started using dimethyl ether, the ether probably hydrolyses to give methyl alcohol. If the reaction is started using methyl alcohol, on the other hand, some of the alcohol combines splitting out water to form dimethyl ether. Though I usually introduce only hydrocarbon groupings into diarylamines by the method of this invention, heterocyclic groupings may also be introduced by selecting an alcohol or ether containing the oxygen on a non-aromatic carbon atom. Furyl substituted diarylamines, for instance, are readily obtained by reacting a diarylamine with furfuryl alcohol, difurfuryl ether, or ethylfurfurylether.

Illustrative of the type of catalyst that may be employed in the reaction are: HCl, $H_3PO_4$, $H_2SO_4$, $NaHSO_4$, $AlCl_3$, $ZnCl_2$, $BF_3$, $SnCl_4$, $NH_4br$, $I_2$, etc. These catalysts are either acids or are capable of generating acids upon hydrolysis or upon contact with organic materials and are well known to promote organic condensation reactions, and may for convenience be termed "acidic condensation catalysts." The halides of amphoteric metals, generally termed Friedel-Crafts catalysts, seem to be the most useful.

The temperature at which this type of reaction can be conducted varies within wide limits. Usually it lies between 100° and 400° C.

An example that illustrates one manner of practicing this invention is the reaction of diphenylamine and ethanol. 254 g. of diphenylamine, 34.5 g. of absolute ethanol and 101 g. of zinc chloride were reacted under a pressure of 200 lbs. per sq. in. of hydrogen at 270°–286° C. in an Adkins reducer having an iron liner. After cooling, the oil layer was poured from the zinc chloride, washed with water, and distilled in a coil arm flask to produce a fair yield of p-ethyl diphenylamine.

A second example is the reaction of diphenylamine and di-isopropyl ether. 338 g. of diphenylamine, 102 g. of isopropyl ether, and 102 g. of zinc chloride were heated in an iron autoclave for an hour at 265°–302° C. The oily layer was separated from the zinc chloride, washed with hexane, water, dilute sodium hydroxide, and water, respectively, and distilled. 250 grams of a product consisting essentially of phenyl p-cumyl amine were obtained.

In a third example, 85 g. of diphenylamine, 49 g. of furfuryl alcohol and 1 c. c. of concentrated hydrochloric acid were heated in an open flask for 3 hours at 110–115° C. The product was dissolved in benzene, dried, and distilled. The product, believed to be p-furyl diphenylamine, was tested in rubber, and was found to have markedly higher activity as an antioxidant than diphenylamine.

In any of these examples the diphenylamine may be replaced by any of the other diarylamines referred to, and other catalysts may be employed to produce the same reactions.

While I have herein disclosed various specific embodiments of my invention, I do not intend to limit myself wholly thereto, for many modifications including substituting equivalent materials and varying the amounts of materials used are within the spirit and scope of my invention as defined in the appended claims.

I claim:

1. The method of preparing nuclear substituted diphenylamine which comprises reacting diphenylamine with a dialkyl ether in the presence of an acidic condensation catalyst.

2. The method of preparing nuclear substituted diarylamines which comprises reacting diphenylamine with a dialkyl ether in the presence of an amphoteric metal halide.

3. The method of preparing nuclear substituted diarylamines which comprises reacting in the presence of an acidic condensation catalyst a diarylamine with a dialkyl ether.

4. The method of preparing nuclear substituted diarylamines which comprises reacting in the presence of an acidic condensation catalyst an aryl phenylamine with a dialkyl ether.

DAVID CRAIG.